US012124776B2

(12) United States Patent
Yan et al.

(10) Patent No.: US 12,124,776 B2
(45) Date of Patent: Oct. 22, 2024

(54) MARINE CABLE MULTIFUNCTIONAL INTEGRATED SOFTWARE DEVELOPMENT PLATFORM, METHOD, AND STORAGE MEDIUM

(71) Applicants: DALIAN UNIVERSITY OF TECHNOLOGY, Liaoning (CN); NINGBO RESEARCH INSTITUTE OF DALIAN UNIVERSITY OF TECHNOLOGY, Ningbo (CN)

(72) Inventors: Jun Yan, Liaoning (CN); Haitao Hu, Liaoning (CN); Zhixun Yang, Liaoning (CN); Dongling Geng, Liaoning (CN); Qingzhen Lu, Liaoning (CN); Jinlong Chen, Liaoning (CN); Qi Su, Liaoning (CN); Shanghua Wu, Liaoning (CN)

(*) Notice: Subject to any disclaimer, the term of this patent is extended or adjusted under 35 U.S.C. 154(b) by 0 days.

(21) Appl. No.: 18/042,360

(22) PCT Filed: Aug. 15, 2022

(86) PCT No.: PCT/CN2022/112462
§ 371 (c)(1),
(2) Date: Feb. 21, 2023

(87) PCT Pub. No.: WO2023/065793
PCT Pub. Date: Apr. 27, 2023

(65) Prior Publication Data
US 2024/0265161 A1   Aug. 8, 2024

(30) Foreign Application Priority Data
Oct. 19, 2021   (CN) .......................... 202111216970.1

(51) Int. Cl.
G06F 9/44     (2018.01)
G06F 8/20     (2018.01)
(Continued)

(52) U.S. Cl.
CPC ................ G06F 30/17 (2020.01); G06F 8/20 (2013.01)

(58) Field of Classification Search
CPC . G06F 30/17; G06F 8/20; G06F 30/16; G06F 30/18; G06F 30/23; G06F 30/27; G06N 20/00
See application file for complete search history.

(56) References Cited

U.S. PATENT DOCUMENTS 11,334,794 B2 *   5/2022   Celano ................ G01C 21/203
2019/0331085 A1 * 10/2019   Mundon ............. F03B 13/1895
(Continued)

FOREIGN PATENT DOCUMENTS

CN   106202727 A  * 12/2016   ............. G06F 30/17
CN   110008509 A  *  7/2019   ......... G06F 17/5009
(Continued)

OTHER PUBLICATIONS

Daniel Mihai Toma, Multi-platform underwater passive acoustics instrument for a more cost-efficient assessment of ocean ecosystems, 2015, pp. 1-6. https://ieeexplore.ieee.org/stamp/stamp.jsp?tp=&arnumber=7151401 (Year: 2015).*
(Continued)

*Primary Examiner* — Mongbao Nguyen

(57) ABSTRACT

A marine cable multifunctional integrated software development system, a method, and a storage medium. The marine cable multifunctional integrated software development system includes a pre-processing module, an integrated software analysis module, a performance verification module, a post-processing module, and a data-driven module based on a cloud database. The method includes: inputting or calling engineering basic data, constructing and arranging structural elements, completing the cross-section design of the marine cable, carrying out the optimization design on the cable section layout and line type based on a
(Continued)

section performance analysis result, and then carrying out the safety check; storing and reading key data in the system, and predicting and designing a cable section layout mode and a cable line type structure rapidly and intelligently; and carrying out visual display and export on a system calculation result.

9 Claims, 7 Drawing Sheets

(51) Int. Cl.
 *G06F 9/445* (2018.01)
 *G06F 9/455* (2018.01)
 *G06F 30/17* (2020.01)

(56) References Cited

U.S. PATENT DOCUMENTS

| | | | | |
|---|---|---|---|---|
| 2020/0174858 | A1* | 6/2020 | Wildhagen | G06F 9/542 |
| 2022/0327258 | A1* | 10/2022 | Wang | G06F 30/17 |
| 2022/0398537 | A1* | 12/2022 | Kunhikrishnan | G06Q 10/0875 |

FOREIGN PATENT DOCUMENTS

| | | | | | |
|---|---|---|---|---|---|
| CN | 111653401 | A | | 9/2020 | |
| CN | 112016236 | A | * | 12/2020 | |
| CN | 112417726 | A | * | 2/2021 | G06F 30/23 |
| CN | 113408174 | A | * | 9/2021 | |
| CN | 113868820 | A | | 12/2021 | |
| DE | 102019208923 | A1 | * | 12/2020 | |

OTHER PUBLICATIONS

Welschinger et al. (DE 102019208932 A1), 2020, pp. 1-7. (Year: 2020).*
Zhang et al. (CN 11340817 A), 2021, pp. 1-28. (Year: 2021).*
Wang et al. (CN 110008509 A), 2019, pp. 1-11 (Year: 2019).*
Krupali Gawas, Development of a low cost remotely operated vehicle for monitoring underwater marine, 2020, pp. 1-7. https://ieeexplore.ieee.org/stamp/stamp.jsp?tp=&arnumber=9389277 (Year: 2020).*
Jack Collins, A Review of Physics Simulators for Robotic Applications, 2021, pp. 1-16. https://ieeexplore.ieee.org/stamp/stamp.jsp?tp=&arnumber=9386154 (Year: 2021).*
Daniel Mihai Toma, Multi-platform underwater passive acoustics instrument for a more cost-efficient assessment of ocean ecosystems, 2015, pp. 1-6. https://ieeexplore.ieee.org/stamp/stamp.jsp?arnumber=7151401 (Year: 2015).*
Mohammad Jahanbakht, Internet of Underwater Things and Big Marine Data Analytics—A Comprehensive Survey, 2021, pp. 1-54. https://arxiv.org/pdf/2012.06712 (Year: 2021).*
English translation, Shen et al. (CN 106202727 A), pp. 1-17, 2016. (Year: 2016).*
English translation, Zhao et al. (CN 112016236 A), pp. 1-8, 2020. (Year: 2020).*
English translation, Ren et al. (CN 112417726 A), pp. 1-10, 2021. (Year: 2021).*
(Provasi, Rodrigo, ect) (An Integrated Environment for Design and Analysis of Umbilical Cables) (Proceedings of the ASME 2017 36th International Conference on Ocean, Offshore and Arctic Engineering) Jun. 30, 2017(Jun. 30, 2017) ,pp. 1-8.
International search report of PCT/CN2022/112462.

* cited by examiner

MARINE CABLE MULTIFUNCTIONAL INTEGRATED SOFTWARE DEVELOPMENT PLATFORM, METHOD, AND STORAGE MEDIUM

CROSS REFERENCE

The present application claims foreign priority of Chinese Patent Application No. 202111216970.1, filed on Oct. 19, 2021, in the China National Intellectual Property Administration, the entire contents of which are hereby incorporated by reference in its entirety.

TECHNICAL FIELD

The present disclosure relates to the technical field of marine cable engineering, in particular to a marine cable multifunctional integrated software development platform, a method, and a storage medium.

BACKGROUND

Marine flexible pipe and cable is the "blood vessel" and "nerve line" of marine oil and gas resources development equipment. The design and analysis of marine cables has been a core technology in the international arena. Orcaflex, as a representative software for the overall hydrodynamic analysis of marine cables, is a mature commercial analysis software, with a large amount of experimental data base, and can carry out static and dynamic analysis of cables connected to floating structures; Bflex is a computational software for nonlinear static and dynamic analysis of marine cables, which is a professional software developed on the basis of finite element method and can simulate the armor layer, sheath layer and conductor structure of marine cables, etc., and give detailed equivalent fatigue resistance and ultimate load of the cross section of marine cables. In addition, USAP and Uflex are mainly used for the analysis of cross-sectional mechanical properties of marine cables, the analysis results are more systematic, and the analysis report can be automatically generated based on the results. The above-mentioned overall hydrodynamic analysis software and cross-sectional analysis software are mostly based on finite element method, mainly for a single marine cable cross-section design or overall line analysis, with relatively single function, which can only provide partial support for the system design of marine cables, while the support role for the integrated design process of marine cable systems needs to be strengthened.

Through the investigation of marine cable design and analysis software in China and other countries, it can be found that the current design and analysis process of marine cables often need to be completed through multiple dedicated computer-aided design software. For example, AutoCAD is used for the design of marine cable sections, UFlex and CableCAD are used to analyze and calibrate the mechanical properties of marine cable sections, and Orcaflex and Riflex are used to analyze and calibrate the hydrodynamic response of the overall line type of marine cables. However, the input format of each software differs greatly, and the data interaction between software is difficult and error-prone. Moreover, the design process of marine cables requires repeated iterations, and the use of traditional design tools for data interaction will significantly increase the design cycle, which is inefficient and cannot automate the complete design process of marine cables from initial design to final design evaluation.

Therefore, how to get rid of the traditional engineering empirical design method of marine cables, realize the automatic communication between different computer software, integrate the design process of marine cables, improve the reliability of data transformation between software, and realize the intelligent and rapid marine cable structure design and structural optimization design is a problem that needs to be solved by those skilled in the art.

SUMMARY OF THE DISCLOSURE

In view of this, the present disclosure provides a multifunctional integrated software development platform, method and storage medium for marine cables, which can realize the integration of the platform for a variety of international software used in the design of marine cables, automate the data interaction between the software, and be able to analyze and optimize the design results for multi-field coupling, multi-scale and multi-condition load, and realize the intelligence of the design of marine cable structure and rapid prediction of performance through cloud database and data-driven technology, with good openness and data transformation capability.

To achieve the above purpose, the present disclosure provides a multifunctional integrated software development platform for a marine cable, comprising: a pre-processing module, an integrated software analysis module, a performance verification module, a post-processing module, and a data-driven module based on a cloud database; wherein, the pre-processing module is configured to, based on engineering basic data input or called from the data-driven module based on the cloud database, construct and arrange structural units to form a cross-section design of the marine cable; the pre-processing module is connected to the integrated software analysis module, the data-driven module based on the cloud database, and the post-processing module;

the integrated software analysis module is configured to establish a data transmission between different domestic and foreign software applied to analysis and calculation of a structure of the marine cable by creating an open software interface, obtain parameter information based on a result of the cross-section design of the marine cable, complete multi-field coupling analysis and design optimization of a layout and a line type of the cross-section design of the marine cable through the data transmission, and send an output result to the performance verification module, the post-processing module, and the data-driven module based on the cloud database;

the performance verification module is configured to perform safety check on the output result of the integrated software analysis module based on an industry cable design verification standard and a special verification standard added by an operator, and send an approved cable design scheme to the data-driven module based on the cloud database and the post-processing module;

the data-driven module based on the cloud database is configured to store and read key data in the software development platform, and perform fast and intelligent predictions and designs on the layout and line type of the cross-section design of the marine cable with machine learning and deep learning methods;

the post-processing module is configured to visualize and export a calculation result of the software development platform.

The above technical solution discloses the specific structural settings of the multifunctional integrated software development platform for marine cables in the present disclosure, which can automate the data interaction between software, realize the intelligence of marine cable structure design and rapid performance prediction through cloud database and data-driven technology, and have better openness and data transformation capability.

In some embodiments, the pre-processing module comprises a parameter input submodule, a unit construction submodule, and a cross-section design submodule; the parameter input submodule, the unit construction submodule, and the cross-section design submodule are connected in sequence;

the parameter input submodule is configured to input engineering parameters, for providing basic data for subsequent engineering including cloud database storage, calculation, analysis, optimization design, security check, and calculation report analysis;

the unit construction submodule is configured to, based on given geometric parameters and/or the engineering parameters input by the parameter input submodule in the cloud database, construct the structural units;

the cross-section design submodule is configured to arrange the structural elements by parametrically defining a relationship between the structural elements or freely dragging the structural elements to form the cross-section design of the marine cable.

The above technical solution discloses the specific structural settings of the pre-processing module, and also discloses a unique form of unit component formation, which can achieve accurate modeling of complex cross-sections by direct mouse dragging, with obvious user-friendliness and ease of operation.

In some embodiments, the engineering parameters comprise: water depth, wave height, flow velocity, period, floating body parameters, material parameters, standard specifications, elastic modulus, shear modulus, Poisson's ratio, resistivity, and thermal conductivity.

In some embodiments, the integrated software analysis module comprises a cross-section analysis submodule, a finite element multi-physics coupling analysis submodule, and an overall line design submodule;

the cross-section analysis submodule is configured to obtain parameters including tensile stiffness, bending stiffness, torsional stiffness, minimum bending radius, maximum allowable stress, stability parameters, breakdown voltage, and insulation resistance based on a cross-section design result of the pre-processing module; the cross-section analysis submodule is further configured to send an output result to the overall line design submodule, the performance verification module, the post-processing module, and the data-driven module based on the cloud database;

the finite element multi-physics coupling analysis submodule is connected to finite element analysis software including ANSYS, ABAQUS, and is configured to calculate parameters comprising tensile stiffness, bending stiffness, torsional stiffness, minimum bending radius, maximum allowable stress, stability parameters, stress, displacement, temperature, breakdown voltage, and insulation resistance based on the cross-section design result of the pre-processing module and consideration of electrical, thermal, magnetic and mechanical loads, and send an output result to the overall line design submodule, the performance verification module, the post-processing module, and the data-driven module based on the cloud database;

the overall line design submodule is configured to perform an overall line arrangement of the marine cable according to different marine conditions; optimize a line type design of the marine cable based on overall analysis software comprising Orcaflex and Fluent according to design objectives comprising maximum tension, minimum bending radius, tensile stiffness, bending stiffness, torsional stiffness requirements and stability requirements of the marine cable; and perform design optimization under multi-scale coupling conditions combining the layout and line type of the cross-section design of the marine cable, calculate parameters comprising tensile stiffness, bending stiffness, minimum bending radius, maximum tension, maximum curvature, local stress of the line type of the marine cable, and send an output result to the performance verification module and the data-driven module based on the cloud database.

In some embodiments, the cross-section analysis submodule is further configured to perform design optimization on the layout of the cross-section design of the marine cable according to design objectives comprising cross-section maximum stiffness, cross-section optimal heat dissipation layout, and a layout of cross-section functional requirements.

In some embodiments, the cross-section analysis submodule is further configured to calculate and obtain basic cross-section parameters comprising section stiffness and manufacturing cost based on the layout of the cross-section design of the marine cable.

The above technical solution discloses the specific structure setting of the integrated software analysis module. The present disclosure can realize the performance analysis and multi-scale analysis of marine flexible cable under multi-physical field coupling conditions, coupling analysis of marine flexible cable cross-sectional performance and overall line type, and realize multi-scale optimization design of marine flexible cable.

In some embodiments, the data-driven module based on the cloud database comprises a cloud database submodule and a data-driven submodule;

the cloud database submodule is configured to store key data in the pre-processing module and the integrated software analysis module in a cloud by building a connection between a local user and a server; the cloud database submodule is connected with the data-driven submodule; the cloud database submodule is also interconnected with the pre-processing module, the integrated software analysis module, and the performance verification module;

the data-driven submodule is configured to realize a rapid and intelligent prediction and design of the layout and line type of the cross-section design of the marine cable by reading and processing a data set stored in the cloud database submodule through a big data technology, based on machine learning and deep learning methods; and to store a cable design result.

The above technical solution discloses the specific structure setting of the data-driven module based on the cloud database. The present disclosure can realize the intelligent design and rapid prediction of the marine flexible cable structure based on the data drive by constructing the cloud database and training the deep learning model with it.

In some embodiments, the post-processing module comprises an AutoCAD submodule, a three-dimensional display submodule, and an analysis report submodule;

the AutoCAD submodule is based on an AutoCAD commercial software; by calling an AutoCAD submodule port in the software development platform, the AutoCAD submodule is configured to transmit result information of the pre-processing module and the integrated software analysis module in the software development platform into the AutoCAD software in the form of a command stream, and transmits a cable result designed by the software development platform in the form of engineering design drawings;

the three-dimensional display submodule is configured to display the result information of the pre-processing module and the integrated software analysis module in the software development platform in the form of a three-dimensional structure visualization;

the analysis report submodule is configured to, based on Office software, export the result information of the preprocessing module and the integrated software analysis module in the software development platform in the form of a report by calling an analysis report module port in the software development platform, which is convenient for designers to summarize and report.

The above technical solution discloses the specific settings of the post-processing module. The present disclosure has better openness and data transformation capability, and the software development platform is an integrated software platform that can interfacing and data transformation with most of the current mainstream cable software and has strong comprehensive processing capability.

The present disclosure further provides a multifunctional integrated software development method for a marine cable, comprising:

inputting or calling engineering basic data, constructing and arranging structural units, and forming a cross-section design of the marine cable;

by creating an open software interface, establishing a data transmission between different domestic and foreign software applied to analysis and calculation of a structure of the marine cable; obtaining parameter information based on a result of the cross-section design of the marine cable, and completing multi-field coupling analysis and design optimization of a layout and a line type of the cross-section design of the marine cable through the data transmission;

performing safety check on the output result of the integrated software analysis module based on an industry cable design verification standard and a special verification standard added by an operator, and obtaining an approved cable design scheme;

storing and reading key data in the software development platform, and performing fast and intelligent predictions and designs on the layout and line type of the cross-section design of the marine cable with machine learning and deep learning methods; and visualizing and exporting a calculation result of the software development platform.

The present disclosure further provides a non-transitory computer storage medium, storing a computer program; wherein when the computer program is executed by a processor, steps of the software development method are implemented.

As can be seen from the above technical solutions, the present disclosure discloses the provision of a multifunctional integrated software development platform, method, and storage medium for marine cables, which has the following beneficial effects compared with the related art.

(1) The present disclosure can realize the performance analysis of the marine cable under multi-physical field coupling conditions. Due to the existence of multi-physical field effects and special constraints in more functional unit categories inside the marine cable, and the present disclosure can consider such effects and perform performance analysis.

(2) The present disclosure can realize multi-scale analysis of marine flexible cables, and can perform coupling analysis of the cross-sectional performance of the marine cable and the overall line type, and pass the calculation results of the cross-sectional performance of the cable to the overall line type design module for overall line type design, while the multi-scale optimization design of the marine cable can be realized through continuous iteration of the cross-sectional performance and overall line type design results.

(3) The present disclosure is able to realize intelligent design and rapid prediction of the marine cable structure based on data-driven, by building a cloud-based database and using it to train a deep learning model.

(4) The present disclosure has a unique form of unit component formation, which enables accurate modeling of complex cross-sections by direct dragging of the mouse, with obvious user-friendliness and ease of operation.

(5) The present disclosure has good openness and data transformation capability, and the software development platform is an integrated software platform, capable of interfacing and data transformation with most of the current mainstream cable software, with strong comprehensive processing capability.

BRIEF DESCRIPTION OF THE DRAWINGS

In order to more clearly illustrate the technical solutions in the embodiments of the present disclosure, the following is a brief description of the accompanying drawings used in the description of the embodiments, and it is obvious that the following description of the accompanying drawings are only some embodiments of the present disclosure. For those skilled in the art, without creative work, other drawings can be obtained based on these drawings.

DETAILED DESCRIPTION

The technical solutions in the embodiments of the present disclosure will be clearly and completely described below with reference to the accompanying drawings in the embodiments of the present disclosure. Obviously, the described embodiments are only a part of the embodiments of the present disclosure, but not all of the embodiments. Based on the embodiments of the present disclosure, all other embodiments obtained by those skilled in the art without creative efforts shall fall within the scope of the present disclosure.

Embodiment 1

Figure 1:
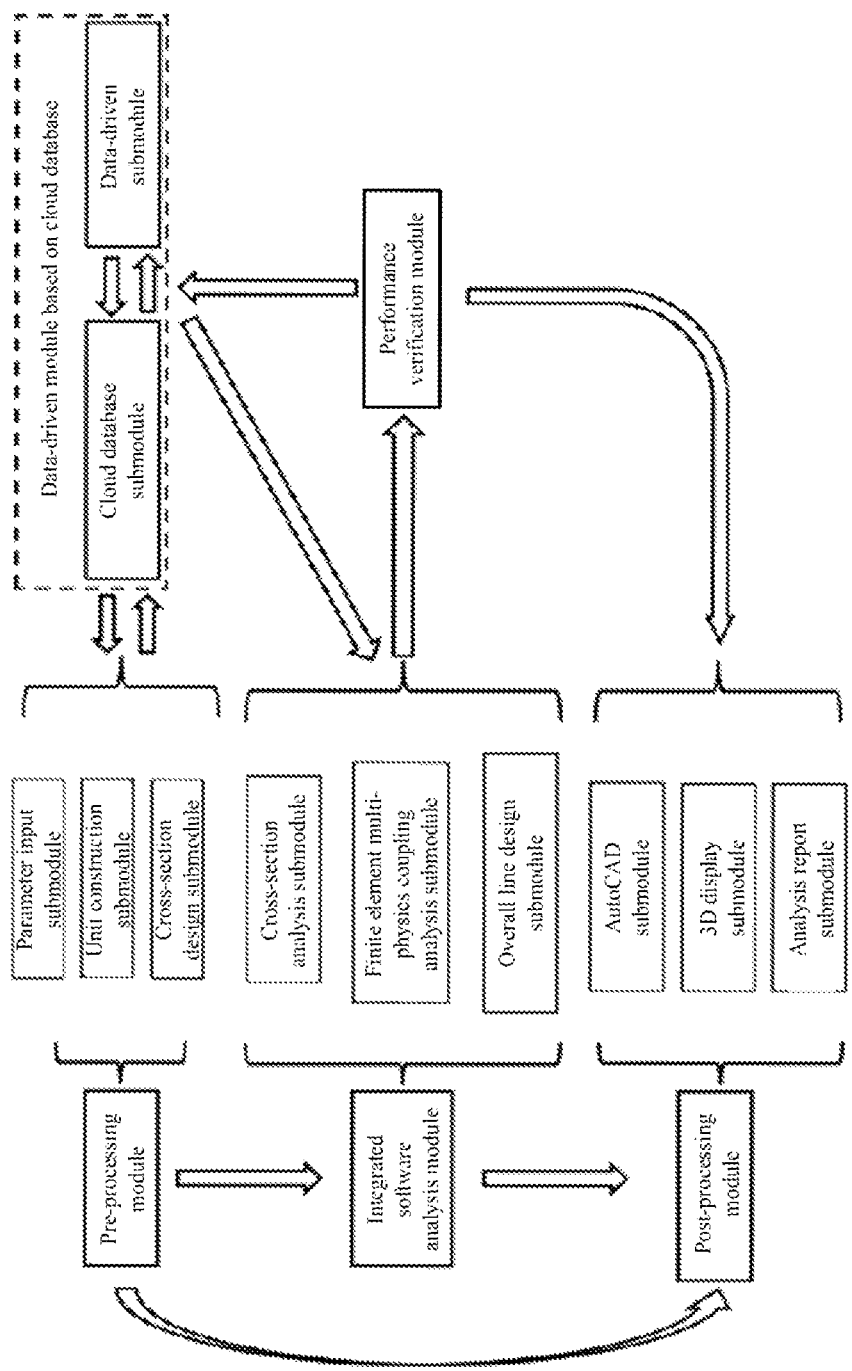
FIG. 1 is an overall frame diagram of a multifunctional integrated software development platform for marine cables.

The embodiment of the present disclosure discloses a multifunctional integrated software development platform for marine cables, as shown in FIG. 1, including: a pre-processing module, an integrated software analysis module, a performance verification module, a post-processing module, and a data-driven module based on a cloud database.

The pre-processing module is configured to, based on engineering basic data input or called from the data-driven module based on the cloud database, construct and arrange structural units to form a cross-section design of a marine cable; the pre-processing module is connected to the integrated software analysis module, the data-driven module based on the cloud database, and the post-processing module.

The integrated software analysis module is configured to establish a data transmission between different domestic and foreign software applied to analysis and calculation of a structure of the marine cable by creating an open software interface, obtain parameter information based on a result of the cross-section design of the marine cable, complete multi-field coupling analysis and design optimization of a layout and a line type of the cross-section design of the marine cable through the data transmission, and send an output result to the performance verification module, the post-processing module, and the data-driven module based on the cloud database.

Figure 5:
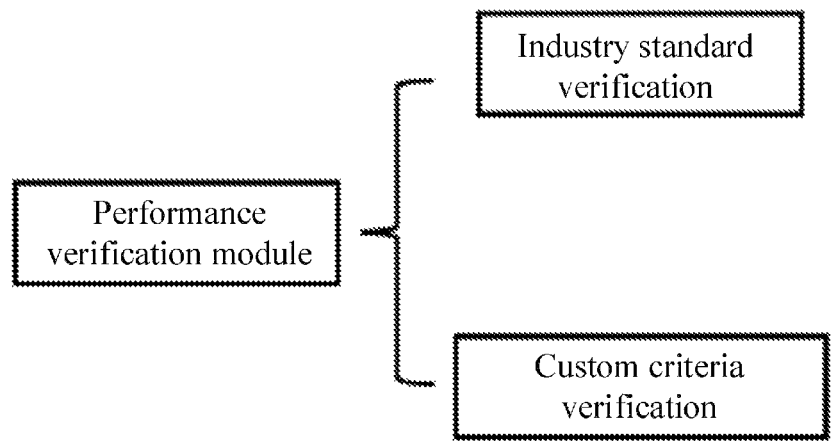
FIG. 5 is a structure diagram of a performance verification module.

The performance verification module, as shown in FIG. 5, is configured to perform safety check on the output result of the integrated software analysis module based on an industry cable design verification standard and a special verification standard added by an operator, and send an approved cable design scheme to the data-driven module based on the cloud database and the post-processing module.

The data-driven module based on the cloud database is configured to store and read key data in the software development platform, and perform fast and intelligent predictions and designs on the layout and line type of the cross-section design of the marine cable with machine learning and deep learning methods.

The post-processing module is configured to visualize and export a calculation result of the software development platform.

Figure 2:
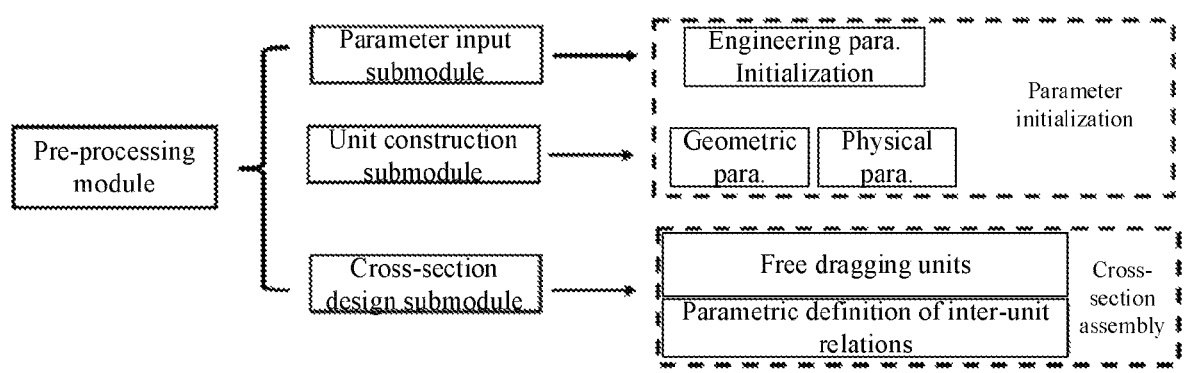
FIG. 2 is a structure diagram of a preprocessing module.

Further, referring to FIG. 2, the pre-processing module includes a parameter input submodule, a unit construction submodule, and a cross-section design submodule; the parameter input submodule, the unit construction submodule, and the cross-section design submodule are connected in sequence.

The parameter input submodule is configured to input engineering parameters, such as water depth, wave height, flow velocity, period, floating body parameters, material parameters, standard specifications, elastic modulus, shear modulus, Poisson's ratio, resistivity, thermal conductivity, etc., for providing basic data for subsequent engineering including cloud database storage, calculation, analysis, optimization design, security check, and calculation report analysis.

The unit construction submodule is configured to, based on given geometric parameters and/or the engineering parameters input by the parameter input submodule in the cloud database, construct a structural unit with a specific unit size and a specific function.

The cross-section design submodule is configured to arrange the structural elements by parametrically defining a relationship between the structural elements or freely dragging the structural elements to form the cross-section design of the marine cable.

Figure 3:
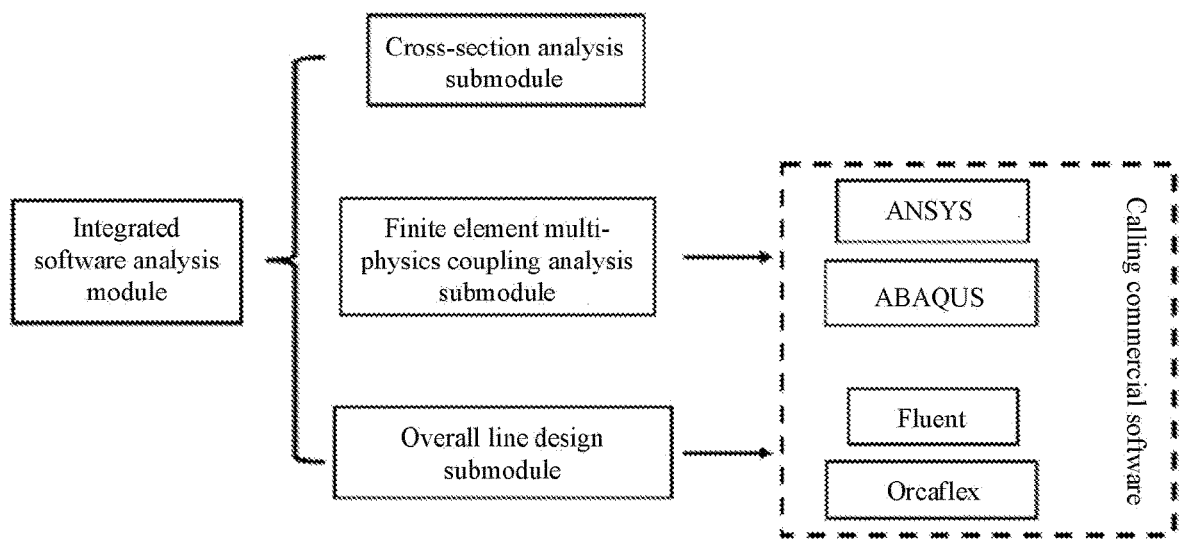
FIG. 3 is a structure diagram of an integrated software analysis module.

Further, referring to FIG. 3, the integrated software analysis module includes a cross-section analysis submodule, a finite element multi-physics coupling analysis submodule, and an overall line design submodule.

The cross-section analysis submodule is configured to perform basic mechanical analysis and functional analysis on a cross-section design result of the cross-section design submodule, and obtain information including tensile stiffness, bending stiffness, torsional stiffness, minimum bending radius, maximum allowable stress, stability parameters, breakdown voltage, and insulation resistance; the cross-section analysis submodule is further configured to realize the optimization design function of the cable cross-section layout according to design objectives such as cross-section maximum stiffness, cross-section optimal heat dissipation layout, and a layout of cross-section functional requirements; the cross-section analysis submodule is further configured to calculate and obtain basic cross-section parameters such as section stiffness and manufacturing cost based on the cross-section layout design, and send an output result to the overall line design submodule, the performance verification module, the post-processing module, and the data-driven module based on the cloud database.

The finite element multi-physics coupling analysis submodule may be connected to finite element analysis software such as ANSYS, ABAQUS, etc., to perform multi-physics coupling analysis on the cross-section, considering the multi-physics coupling analysis under electrical, thermal, magnetic and mechanical loads, and calculating parameters including tensile stiffness, bending stiffness, torsional stiffness, minimum bending radius, maximum allowable stress, stability parameters, stress, displacement, temperature, breakdown voltage, and insulation resistance, and sending an output result to the overall line design submodule, the performance verification module, the post-processing module, and the data-driven module based on the cloud database.

The overall line design submodule is configured to perform an overall line arrangement of the cable according to different marine conditions; realize line design and optimization of the cable based on overall analysis software such as Orcaflex, Fluent, etc., according to design objectives such as maximum tension, minimum bending radius, tensile stiffness, bending stiffness, torsional stiffness requirements and stability requirements of the cable, etc.; and combined with the optimization design of the cross-section analysis submodule in the cable partial cross-section analysis and a multi-scale coupling condition of layout and the overall line design, calculating and sending tensile stiffness, bending stiffness, minimum bending radius, and maximum tension, maximum curvature, local stress of the cable line, and other results to the performance verification module and the data-driven module based on the cloud database.

Figure 6:
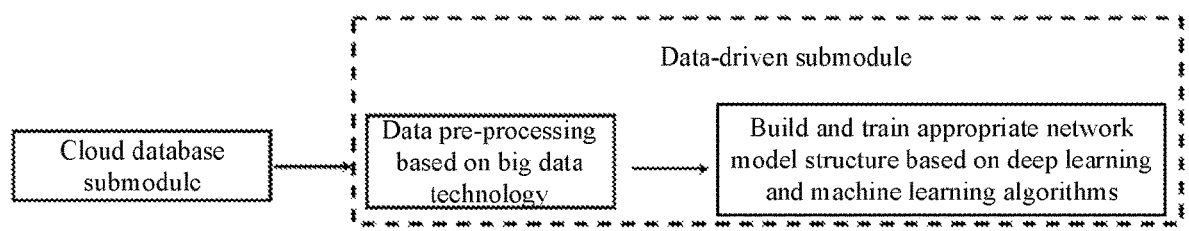
FIG. 6 is a structural diagram of a data-driven module based on a cloud database.

Further, referring to FIG. 6, the data-driven module based on the cloud database includes a cloud database submodule and a data-driven submodule.

The cloud database submodule is configured to store key data in the pre-processing module and the integrated software analysis module in a cloud by building a connection between a local user and a server, which is convenient for subsequent applications; the cloud database submodule is connected with the data-driven submodule; the cloud database submodule is also interconnected with the pre-processing module, the integrated software analysis module, and the performance verification module;

The data-driven submodule is configured to realize a rapid and intelligent prediction and design of the cable cross-section layout and line structure through data records of the cloud database submodule based on the machine learning and deep learning methods; and is interconnected with the cloud database submodule.

Figure 4:
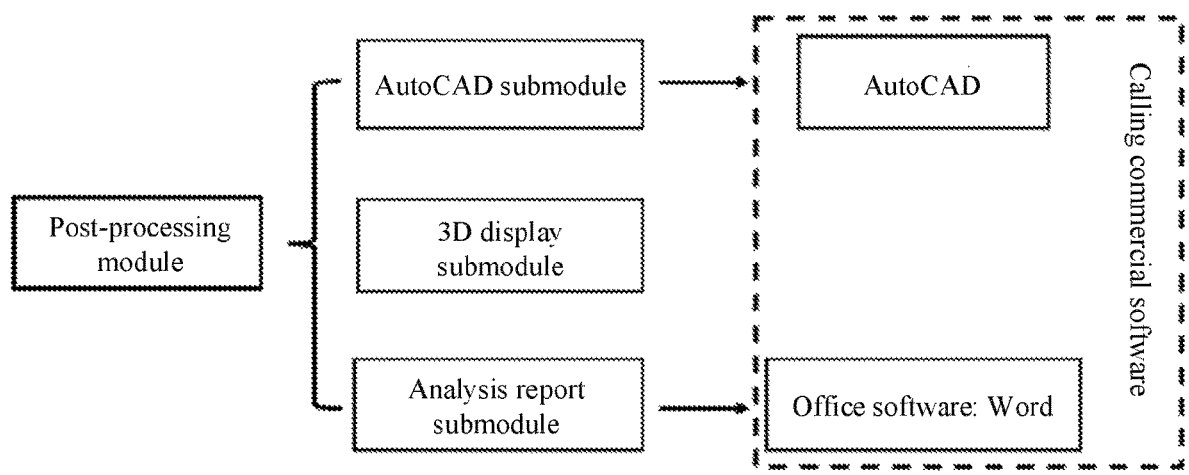
FIG. 4 is a structure diagram of a post-processing module.

Further, as shown in FIG. 4, the post-processing module includes an AutoCAD submodule, a three-dimensional display submodule, and an analysis report submodule.

The AutoCAD submodule is based on an AutoCAD commercial software. By calling an AutoCAD submodule port in the software development platform, the AutoCAD submodule transmits result information of the pre-processing module and the integrated software analysis module in the software development platform into the AutoCAD software in the form of a command stream, and transmits a cable result designed by the software development platform in the form of engineering design drawings.

The three-dimensional display submodule displays the result information of the pre-processing module and the integrated software analysis module in the software development platform in the form of a three-dimensional structure visualization.

The analysis report submodule, based on Office software, exports the result information of the preprocessing module and the integrated software analysis module in the software development platform in the form of a report by calling an analysis report module port in the software development platform.

Embodiment 2

The embodiments of the present disclosure further disclose a multifunctional integrated software development method for marine cables, including the following steps.

Inputting or calling engineering basic data, constructing and arranging structural units, and forming a cross-section design of the marine cable.

By creating an open software interface, establishing a data transmission between different domestic and foreign software applied to analysis and calculation of a structure of the marine cable; obtaining parameter information based on a result of the cross-section design of the marine cable, and completing multi-field coupling analysis and design optimization of a layout and a line type of the cross-section design of the marine cable through the data transmission.

Performing safety check on the output result of the integrated software analysis module based on an industry cable design verification standard and a special verification standard added by an operator, and obtaining an approved cable design scheme.

Storing and reading key data in the software development platform, and performing fast and intelligent predictions and designs on the layout and line type of the cross-section design of the marine cable with machine learning and deep learning methods.

Visualizing and exporting a calculation result of the software development platform.

The embodiments of the present disclosure further disclose a computer storage medium, on which a computer program is stored, and when the computer program is executed by a processor, the steps of the above software development method are implemented.

The present disclosure can be applied to the field of multi-scale analysis of the cross-section of the marine cable and the overall line type of the marine cable, the multi-physical field coupling analysis of the marine cable, and data-driven fast marine cable analysis based on specific embodiments, which are explained and illustrated below.

Taking the multi-physical field coupling analysis of an umbilical cable in the marine cable as an example, referring to Table 1, the present disclosure can realize the multi-physical field coupling analysis. The four-layer armored umbilical cable of the central cable contains many complex units such as optical fiber, cable, hydraulic pipe, scale inhibitor pipe, and armored steel wires. The software development platform in the present disclosure is able to perform multi-physical field coupling analysis of force, electric, magnetic and temperature fields for such umbilical cable interfaces with complex cross-sectional shapes and considering electrothermal and special constraints due to optical fibers.

TABLE 1

| Power supply umbilical cable | | |
|---|---|---|
| Physical parameter | Unit | Calculation result |
| Outer diameter | Mm | 170.6 ± 3 |
| Dry weight | kg/m | 63.96 |
| Wet weight | kg/m | 42.18 |
| Ratio of outer diameter to wet weight | $m^2$/KN | 0.41 |
| Tensile stiffness | N | 11.9E±08 |
| Bending stiffness | $N*m^2$ | 113761 |
| Torsional stiffness | $N*m^2$ | 19677 |
| Maximum allowable stress | N | 1307848 |
| Minimum bending radius | M | 4.87 |
| Maximum working tension | kN | 653 |
| Minimum breaking tension | kN | 1307 |

Figure 7:
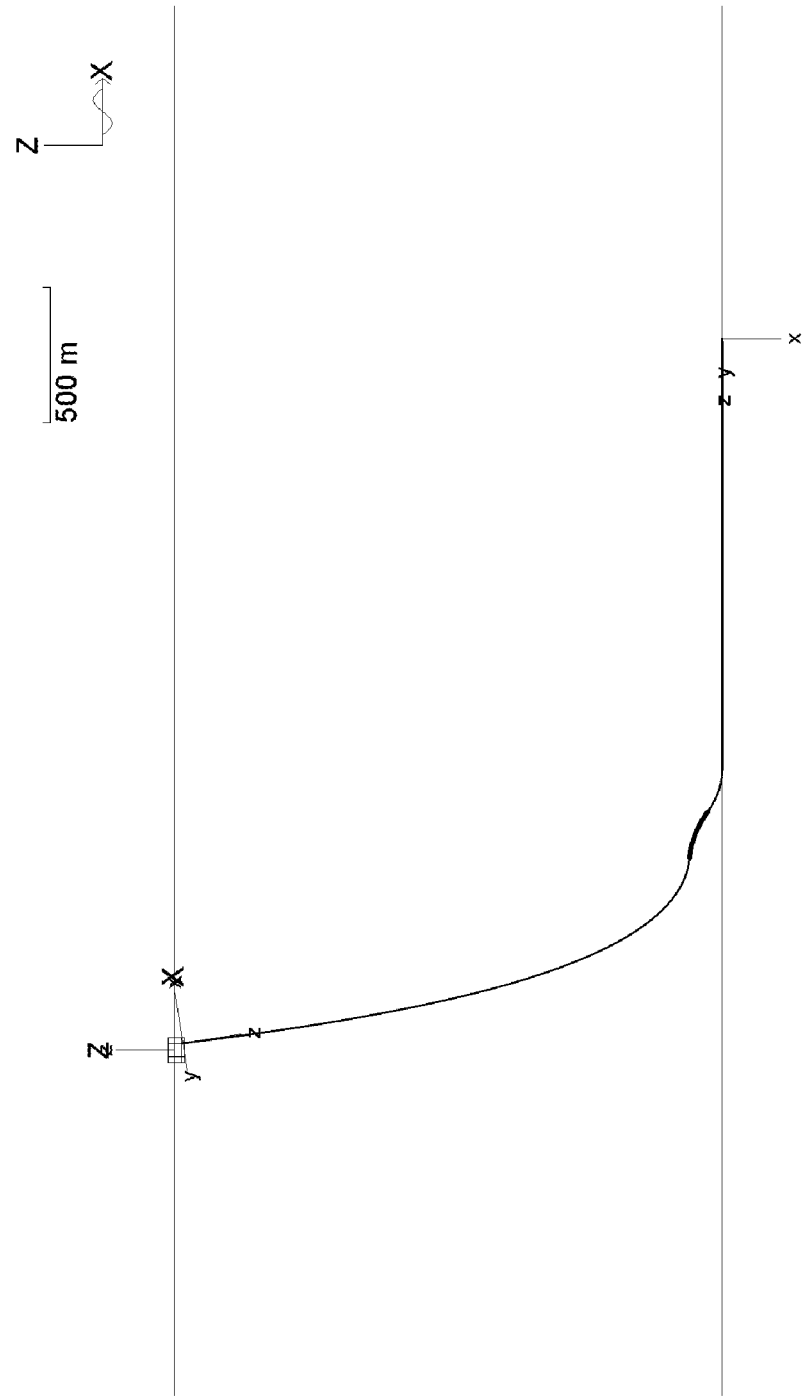
FIG. 7 is a graphic display of design results of an overall line design submodule in Orcaflex software.

Taking the multi-scale analysis of the umbilical cable as an example, FIG. 7 is a graphic display of design results of an overall line design submodule in Orcaflex software. The umbilical cable line is based on the above-mentioned four-layer armored umbilical cable cross-sectional mechanics analysis, taking into account the influence of bending stiffeners and buoyancy blocks, and realizing the multi-scale coupling analysis of umbilical cable combining macroscopic line scale and microscopic cross-sectional performance scale.

The present disclosure provides a multi-functional integrated software development platform, a method, and a storage medium for marine cables, which can realize a variety of international software for marine cable design, automate data interaction between software, and perform multi-field coupling analysis, multi-scale and multi-condition load analysis and optimization of design results, and realize intelligent and fast performance prediction of marine cables through cloud database and data-driven technology, with good openness and data conversion capabilities.

The various embodiments in this specification are described in a progressive manner, and each embodiment focuses on the differences from other embodiments, and the same and similar parts between the various embodiments can be referred to each other. For the method disclosed in the embodiments, since it corresponds to the system disclosed in the embodiments, the description is relatively simple, and the relevant part can be referred to the description of the method.

The above description of the disclosed embodiments enables any person skilled in the art to make or use the present disclosure. Various modifications to these embodiments will be readily apparent to those skilled in the art, and the generic principles defined herein may be implemented in other embodiments without departing from the spirit or scope of the present disclosure. Therefore, the present disclosure is not intended to be limited to the embodiments shown herein, but is to be accorded the widest scope consistent with the principles and novel features disclosed herein.

What is claimed is:

1. A multifunctional integrated software development system for a marine cable, comprising:
   a hardware processor;
   a memory stores a pre-processing module, an integrated software analysis module, a performance verification module, a post-processing module, and a data-driven module based on a cloud database;
   wherein, the pre-processing module is configured to, based on engineering basic data input or called from the data-driven module based on the cloud database, construct and arrange structural elements to form a cross-section design of the marine cable;
   the pre-processing module is connected to the integrated software analysis module, the data-driven module based on the cloud database, and the post-processing module;
   the integrated software analysis module is configured to establish a data transmission between different software applied to analysis and calculation of a structure of the marine cable by creating an open software interface, obtain parameters based on a result of the cross-section design of the marine cable, complete multi-field coupling analysis and design optimization of a layout and a line type of the cross-section design of the marine cable through the data transmission, and send an output result to the performance verification module, the post-processing module, and the data-driven module based on the cloud database;
   the performance verification module is configured to perform safety check on the output result of the integrated software analysis module based on an industry cable design verification standard and a special verification standard added by an operator, and send an approved cable design scheme to the data-driven module based on the cloud database and the post-processing module;
   the data-driven module based on the cloud database is configured to store and read a key data in the software development-system, and perform-predictions and designs on the layout and line type of the cross-section design of the marine cable with machine learning and deep learning methods, the hardware processor configured to train the deep learning model realize the intelligent design and rapid prediction of marine flexible cable structure based on the data drive module by constructing the cloud database, wherein the key data comprises the output result sent by the integrated software analysis module and the approved cable design scheme sent by the performance verification module,
   the post-processing module is configured to visualize and export the output result sent by the integrated software analysis module and the approved cable design scheme sent by the performance verification module;
   wherein the integrated software analysis module comprises a cross-section analysis submodule, a finite element multi-physics coupling analysis submodule, and an overall line design submodule;
   the cross-section analysis submodule is configured to obtain the parameters including tensile stiffness, bending stiffness, torsional stiffness, minimum bending radius, maximum allowable stress, stability parameters, breakdown voltage, and insulation resistance based on a cross-section design result of the pre-processing module; the cross-section analysis submodule is further configured to send an output result to the overall line design submodule, the performance verification module, the post-processing module, and the data-driven module based on the cloud database;
   the finite element multi-physics coupling analysis submodule is connected to finite element analysis software including ANSYS, ABAQUS, and is configured to calculate the parameters comprising tensile stiffness, bending stiffness, torsional stiffness, minimum bending radius, maximum allowable stress, stability parameters, stress, displacement, temperature, breakdown voltage, and insulation resistance based on the cross-section design result of the pre-processing module and consideration of electrical, thermal, magnetic and mechanical loads, and send an output result to the overall line design submodule, the performance verification module, the post-processing module, and the data-driven module based on the cloud database; and
   the overall line design submodule is configured to perform an overall line arrangement of the marine cable according to different marine conditions; optimize a line type design of the marine cable based on overall analysis software comprising Orcaflex and Fluent according to design objectives comprising maximum tension, minimum bending radius, tensile stiffness, bending stiffness, torsional stiffness requirements and stability requirements of the marine cable; and perform design optimization under multi-scale coupling conditions combining the layout and line type of the cross-section design of the marine cable, calculate the parameters comprising tensile stiffness, bending stiffness, minimum bending radius, maximum tension, maximum curvature, local stress of the line type of the marine cable, and send an output result to the performance verification module and the data-driven module based on the cloud database,
   wherein the modules and submodules are stored in the memory and executable by the hardware processor.

2. The multifunctional integrated software development system according to claim 1, wherein the pre-processing module comprises a parameter input submodule, an element construction submodule, and a cross-section design submodule; the parameter input submodule, the element construction submodule, and the cross-section design submodule are connected in sequence;
   the parameter input submodule is configured to input engineering parameters, for providing basic data for subsequent engineering including cloud database storage, calculation, analysis, optimization design, security check, and calculation report analysis;
   the element construction submodule is configured to, based on given geometric parameters and/or the engineering parameters input by the parameter input submodule in the cloud database, construct the structural elements;

the cross-section design submodule is configured to arrange the structural elements by parametrically defining a relationship between the structural elements or freely dragging the structural elements to form the cross-section design of the marine cable.

3. The multifunctional integrated software development system according to claim 2, wherein the engineering parameters comprise: water depth, wave height, flow velocity, period, floating body parameters, material parameters, standard specifications, elastic modulus, shear modulus, Poisson's ratio, resistivity, and thermal conductivity.

4. The multifunctional integrated software development system according to claim 1, wherein the cross-section analysis submodule is further configured to perform design optimization on the layout of the cross-section design of the marine cable according to design objectives comprising cross-section maximum stiffness, cross-section optimal heat dissipation layout, and a layout of cross-section functional requirements.

5. The multifunctional integrated software development system according to claim 1, wherein the cross-section analysis submodule is further configured to calculate and obtain basic cross-section parameters comprising section stiffness and manufacturing cost based on the layout of the cross-section design of the marine cable.

6. The multifunctional integrated software development system according to claim 1, wherein the data-driven module based on the cloud database comprises a cloud database submodule and a data-driven submodule;
the cloud database submodule is configured to store key data in the pre-processing module and the integrated software analysis module in a cloud by building a connection between a local user and a server; the cloud database submodule is connected with the data-driven submodule; the cloud database submodule is also interconnected with the pre-processing module, the integrated software analysis module, and the performance verification module;
the data-driven submodule is configured to realize a rapid and intelligent prediction and design of the layout and line type of the cross-section design of the marine cable by reading and processing a data set stored in the cloud database submodule through a big data technology, based on machine learning and deep learning methods.

7. The multifunctional integrated software development system according to claim 1, wherein the post-processing module comprises an AutoCAD submodule, a three-dimensional display submodule, and an analysis report submodule;
the AutoCAD submodule is based on an AutoCAD software; by calling an AutoCAD submodule port in the software development system, the AutoCAD submodule is configured to transmit result information of the pre-processing module and the integrated software analysis module in the software development system into the AutoCAD software in the form of a command stream, and transmits a cable result designed by the software development system in the form of engineering design drawings;
the three-dimensional display submodule is configured to display the result information of the pre-processing module and the integrated software analysis module in the software development system in the form of a three-dimensional structure visualization;
the analysis report submodule is configured to, based on Office software, export the result information of the preprocessing module and the integrated software analysis module in the software development system in the form of a report by calling an analysis report module port in the software development-system.

8. A multifunctional integrated software development method for a marine cable, the method executable by a hardware processor to:
inputting or calling engineering basic data, constructing and arranging structural elements, and forming a cross-section design of the marine cable;
establishing a data transmission between different software applied to analysis and calculation of a structure of the marine cable by creating an open software interface; obtaining parameters based on a result of the cross-section design of the marine cable, and completing multi-field coupling analysis and design optimization of a layout and a line type of the cross-section design of the marine cable through the data transmission; the hardware processor configured to:
obtaining the parameters including tensile stiffness, bending stiffness, torsional stiffness, minimum bending radius, maximum allowable stress, stability parameters, breakdown voltage, and insulation resistance based on a cross-section design result;
connecting to finite element analysis software including ANSYS, ABAQUS, and calculating the parameters comprising tensile stiffness, bending stiffness, torsional stiffness, minimum bending radius, maximum allowable stress, stability parameters, stress, displacement, temperature, breakdown voltage, and insulation resistance based on the cross-section design result and consideration of electrical, thermal, magnetic and mechanical loads;
performing an overall line arrangement of the marine cable according to different marine conditions; optimizing a line type design of the marine cable based on overall analysis software comprising Orcaflex and Fluent according to design objectives comprising maximum tension, minimum bending radius, tensile stiffness, bending stiffness, torsional stiffness requirements and stability requirements of the marine cable; and performing design optimization under multi-scale coupling conditions combining the layout and line type of the cross-section design of the marine cable, calculating the parameters comprising tensile stiffness, bending stiffness, minimum bending radius, maximum tension, maximum curvature, local stress of the line type of the marine cable;
performing safety check on the output result of an integrated software analysis module based on an industry cable design verification standard and a special verification standard added by an operator, and obtaining an approved cable design scheme;
storing and reading a key data in the software development system, and performing predictions and designs on the layout and line type of the cross-section design of the marine cable with machine learning and deep learning methods, the hardware processor further configured to train the deep learning model realize the intelligent design and rapid prediction of marine flexible cable structure based on the data drive module by constructing the cloud database, wherein the key data comprises the output result sent by the integrated software analysis module and the approved cable design scheme sent by the performance verification module; and
visualizing and exporting—the output result sent by the integrated software analysis module and the approved cable design scheme sent by the performance verification module of the software development-system.

9. A non-transitory computer storage medium, storing a computer program; wherein the computer program is executable by a hardware processor to perform the steps of the software development method to:
   inputting or calling engineering basic data, constructing and arranging structural elements, and forming a cross-section design of the marine cable;
   establishing a data transmission between different software applied to analysis and calculation of a structure of the marine cable by creating an open software interface; obtaining parameters based on a result of the cross-section design of the marine cable, and completing multi-field coupling analysis and design optimization of a layout and a line type of the cross-section design of the marine cable through the data transmission; the hardware processor configured to:
      obtaining the parameters including tensile stiffness, bending stiffness, torsional stiffness, minimum bending radius, maximum allowable stress, stability parameters, breakdown voltage, and insulation resistance based on a cross-section design result;
      connecting to finite element analysis software including ANSYS, ABAQUS, and calculating the parameters comprising tensile stiffness, bending stiffness, torsional stiffness, minimum bending radius, maximum allowable stress, stability parameters, stress, displacement, temperature, breakdown voltage, and insulation resistance based on the cross-section design result and consideration of electrical, thermal, magnetic and mechanical loads;
      performing an overall line arrangement of the marine cable according to different marine conditions; optimizing a line type design of the marine cable based on overall analysis software comprising Orcaflex and Fluent according to design objectives comprising maximum tension, minimum bending radius, tensile stiffness, bending stiffness, torsional stiffness requirements and stability requirements of the marine cable; and performing design optimization under multi-scale coupling conditions combining the layout and line type of the cross-section design of the marine cable, calculating the parameters comprising tensile stiffness, bending stiffness, minimum bending radius, maximum tension, maximum curvature, local stress of the line type of the marine cable;
   performing safety check on the output result of an integrated software analysis module based on an industry cable design verification standard and a special verification standard added by an operator, and obtaining an approved cable design scheme;
   storing and reading a key data in the software development system, and performing predictions and designs on the layout and line type of the cross-section design of the marine cable with machine learning and deep learning methods, the hardware processor further configured to training the deep learning model realize the intelligent design and rapid prediction of marine flexible cable structure based on the data drive module by constructing the cloud database, wherein the key data comprises the output result sent by the integrated software analysis module and the approved cable design scheme sent by the performance verification module; and
   visualizing and exporting—the output result sent by the integrated software analysis module and the approved cable design scheme sent by the performance verification module of the software development-system.

\* \* \* \* \*